United States Patent
Bassi et al.

(10) Patent No.: US 10,437,038 B2
(45) Date of Patent: Oct. 8, 2019

(54) DEVICE AND METHOD FOR CREATING AN OPTICAL TOMOGRAM OF A MICROSCOPIC SAMPLE

(71) Applicant: Max-Planck-Gesellschaft zur Foerderung der Wissenschaften e.V., Munich (DE)

(72) Inventors: Andrea Bassi, Cernusco sul Naviglio (IT); Jan Huisken, Dresden (DE); Benjamin Schmid, Dresden (DE)

(73) Assignee: MAX-PLANCK-GESELLESCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 15/551,891

(22) PCT Filed: Feb. 20, 2015

(86) PCT No.: PCT/EP2015/053654
§ 371 (c)(1),
(2) Date: Aug. 17, 2017

(87) PCT Pub. No.: WO2016/131498
PCT Pub. Date: Aug. 25, 2016

(65) Prior Publication Data
US 2018/0031818 A1 Feb. 1, 2018

(51) Int. Cl.
*G02B 21/12* (2006.01)
*G02B 21/36* (2006.01)
(Continued)

(52) U.S. Cl.
CPC .......... *G02B 21/367* (2013.01); *G02B 21/12* (2013.01); *G02B 21/26* (2013.01); *G02B 21/32* (2013.01)

(58) Field of Classification Search
CPC ...... G02B 21/367; G02B 21/32; G02B 21/12; G02B 21/26
(Continued)

(56) References Cited

U.S. PATENT DOCUMENTS

| 7,009,172 B2 | 3/2006 | Publicover et al. |
| 8,350,230 B2 | 1/2013 | Power et al. |

(Continued)

FOREIGN PATENT DOCUMENTS

| DE | 102007015061 | 10/2008 |
| DE | 102007047461 | 4/2009 |

(Continued)

OTHER PUBLICATIONS

Koniar et al, Hardware conditioning in process of high speed imaging (Year: 2012).*
(Continued)

*Primary Examiner* — Shan E Elahi
(74) *Attorney, Agent, or Firm* — Leydig, Voit & Mayer, Ltd.

(57) ABSTRACT

The invention is directed to a method for creating an optical tomogram, which comprises the steps providing an optical microscope, arranging a sample (1) in the optical coverage region of a lens (5) of the microscope, setting the focus of the lens to a particular focal plane (2), recording an image of the sample through the microscope, rotating the sample through an angle α, optionally displacing the sample along the longitudinal axis (z) of the lens (5) and/or perpendicular to the plane of the previously recorded image (9) and continuing the method with step d) until a predetermined number of section images (9) of the sample (1) have been recorded, wherein the sample (1) is displaced along the longitudinal axis (z) of the lens (5) and/or perpendicular to the plane of the previously recorded image (9), in accor- (Continued)

dance with step f), at least once during a rotation of the sample through 360°. Furthermore the invention is directed to an optical microscope for creating tomograms, which comprises at least one lens (5), at least one sample suspension device (10) and at least one illumination device (6), wherein the sample suspension device (10) is rotatable about an axis (3) arranged perpendicular to the longitudinal axis (z) of the lens (5) and is displaceable along the longitudinal axis (z) of the lens (5).

22 Claims, 8 Drawing Sheets

(51) Int. Cl.
*G02B 21/26* (2006.01)
*G02B 21/32* (2006.01)

(58) Field of Classification Search
USPC .......................................................... 348/79
See application file for complete search history.

(56) References Cited

U.S. PATENT DOCUMENTS

| | | | |
|---|---|---|---|
| 8,482,854 B2 | 7/2013 | Lippert et al. | |
| 9,645,378 B2 | 5/2017 | Hilbert et al. | |
| 2003/0201393 A1* | 10/2003 | Tsuneta | H01J 37/26 250/311 |
| 2004/0264764 A1* | 12/2004 | Kochi | G01B 15/04 382/154 |
| 2006/0287596 A1* | 12/2006 | Johnson | A61B 5/4312 600/437 |
| 2010/0289835 A1* | 11/2010 | Holub | G01J 3/02 345/690 |
| 2014/0353500 A1* | 12/2014 | Tsuneta | H01J 37/20 250/311 |
| 2015/0008339 A1* | 1/2015 | French | G01N 21/4795 250/458.1 |
| 2015/0087902 A1* | 3/2015 | Mertz | G02B 21/14 600/109 |
| 2015/0297084 A1* | 10/2015 | Boppart | A61B 5/0066 600/425 |

FOREIGN PATENT DOCUMENTS

| | | | | |
|---|---|---|---|---|
| WO | WO 2004/079405 | | 9/2004 | |
| WO | WO-2004079405 A2 * | | 9/2004 | ............ G01Q 10/06 |
| WO | WO 2009/129802 | | 10/2009 | |
| WO | WO 2014/056992 | | 4/2014 | |
| WO | WO-2014056992 A1 * | | 4/2014 | ........... G02B 21/002 |

OTHER PUBLICATIONS

International Preliminary Report on Patentability and Written Opinion corresponding to International Application No. PCT/EP2015/053654, dated Aug. 22, 2017.
EP Examination Report, dated Jan. 3, 2019, in European Patent Application No. 15707313.1, a related application, 5 pp.

* cited by examiner

DEVICE AND METHOD FOR CREATING AN OPTICAL TOMOGRAM OF A MICROSCOPIC SAMPLE

DESCRIPTION

The present invention relates to a method for creating an optical tomogram or for creating a tomogram on the basis of optically created section images. The invention further relates to an optical microscope for creating tomograms, which comprises at least one lens, at least one sample holder and at least one light source.

Light microscopes have long been known. In early microscopy, a distinction was merely made between brightfield and dark-field microscopy or transmitted-light and incident-light microscopy. In the $20^{th}$ century, additional techniques have been established by way of phase contrast, interference contrast, fluorescence, polarisation and confocal microscopes. Only in the early $21^{st}$ century were these techniques supplemented with selective plane illumination microscopy (SPIM, or light sheet fluorescence microscopy). This method offers excellent imaging properties of fluorescing or fluorescent objects, for example in an embryo. This method has become established for imaging in living organisms in particular. An advantage is that merely an extremely narrow region of the sample is irradiated, and light-induced stress in biological samples is thus reduced. Thus, fluorescence analyses on living organisms and even long-term observations of embryonic development in model organisms are possible. A drawback of this method is its limitation to objects that fluoresce at the chosen excitation wavelength.

Another comparatively new method for representing microscopic objects is optical tomography. It makes three-dimensional imaging of objects possible without having to specially pre-treat them, for example using fluorophores. However, this method requires the sample to be translucent at least in part to light of the wavelength used. For optical tomography, it is necessary to record a number of projections of the sample, each from a different angle. However, this requires the depth of focus of the optics to span the entire depth of the sample. This large depth of focus is generally achieved with optics with low numerical aperture (NA), which limits the achievable resolution of the images and the subsequent reconstruction of the sample. Alternatively, one could use optics with high NA, providing superior resolution but shallow depth of focus. However, now a stack of images needs to be recorded for each angle in order to cover the full extent of the sample from this particular angle. For this purpose, the focus of the optics is displaced in such a way that a different section of the sample is imaged sharply in each case. Once a sample has been imaged completely in layers at a particular angle, the sample is rotated and the imaging of the sample in layers from a new angle starts afresh. This method is very time-consuming, and can only be implemented for stationary or dead samples. This method is unsuitable for imaging living organisms, which may actually move and may suffer from the repeatedly performed rapid movements.

The object of the present invention is therefore to provide a method and a device with each of which it is possible to record optical tomograms in a gentle and greatly accelerated manner. This object is achieved by a method according to claim 1 and a device according to claim 12.

An essential aspect of the invention is a method for creating an optical tomogram, characterized in that it comprises the following steps:

a) providing an optical microscope,
b) arranging a sample in the optical coverage region of a lens of the microscope,
c) setting the focus of the lens to a particular focal plane,
d) recording an image of the sample by the microscope,
e) rotating the sample through an angle α,
f) optionally displacing the sample along the longitudinal axis of the lens and/or perpendicular to the plane of the previously recorded image,
g) continuing the method with step d) until a predetermined number of images of the sample have been recorded,
wherein the sample being displaced along the longitudinal axis of the lens and/or perpendicular to the plane of the previously recorded image, in accordance with step f), at least once during a rotation of the sample through 360°.

This method makes it possible to accelerate significantly the recording of the section images required for the optical tomography and reduce the burden for living specimens by moving the sample along a smooth trajectory without any abrupt changes in direction.

It has been possible to identify the often changing directions of movement of the probe as especially critical for the stress for the probe and the expenditure of time in the creation of optical tomograms known in the art. By contrast with the methods known in the art, in methods according to the present invention it is not necessary to change the directions of movement of the probe repeatedly during recording. Considerable time can be saved as a result and the probe is less stressed. In the ideal case, in the present invention the movement is a single continuous movement by which the sample is merely moved into the focal plane in different layers and at different angles in each case. This has major advantages, which are described in greater detail in the following.

Instead of moving the sample completely through the focus, along the longitudinal axis of the lens and/or perpendicular to the plane of the previously recorded image, and only subsequently rotating it, it has been found to be advantageous, after recording an image, to rotate the sample and to displace the sample through the focal plane in such a way that the next layer is only recorded from a predetermined angle when the sample has completed a 360° rotation.

To create an optical tomogram, it is necessary for the sample to be imaged repeatedly from each angle α. Ideally, the images acquired from the different angles represent projections. In most cases, however, the depth of focus of the imaging system is not sufficient to span the entire depth of the sample. Hence, it is advisable to record from each angle α a stack of images, which can be computationally merged into what is equivalent to a projection. Hence, in a particularly preferred variant configuration of the method, the sample is imaged n times from each angle α, in different focal planes in each case. n images of the sample are thus created from each angle α. To obtain as informative a tomogram as possible, n is usually >3, preferably >5, particularly preferably between 10 and 1000. Depending on the required (lateral) resolution the imaging system offers a certain depth of focus. The stack of images is ideally acquired such that the images provide a gap-less coverage of the entire depth. Hence, shallow depth of focus (as usually present in high-resolution imaging systems, such as light sheet microscopes) requires more images to be acquired than in cases where the depth of focus is large. For tomograms of microorganisms, a value of n between 15 and 100 has been found to be particularly preferred. These values of n give a good ratio between resolution and storage requirement or measurement time. However, it is naturally also possible for n to be much larger in samples where for example the measurement duration is not critical, so as to increase the resolution and/or the number of section images and thus potentially the quality of the tomogram.

In a preferred variant of the method, after each rotation through the angle α the sample is displaced by a distance along the longitudinal axis of the lens and/or perpendicular to the plane of the previously recorded image. It is preferably displaced in this direction by a distance of $$\frac{360 \cdot D}{\alpha \cdot n},$$

D being the total displacement of the sample during the creation of the optical tomogram. Accordingly, in this method the sample is displaced for each angle by a distance which, after the complete rotation of the sample through 360°, adds to a total distance corresponding to the respective thickness of a layer. The sample is thus imaged in layers in a spiralling manner in each case. The spiral thus formed is preferably an Archimedean spiral, in such a way that the radius varies in proportion to the angle of rotation. Accordingly, at each angle the focal plane is displaced by the constant amount D/n.

As an alternative to this method, it is also possible to rotate the sample on a circular path, without any displacement perpendicular to the longitudinal axis of the lens, and to record a section image at each angle α. Only after a complete rotation through 360° the s ample is displaced along the longitudinal axis of the lens and/or perpendicular to the plane of the previously recorded image. In this variant, the displacement along the longitudinal axis of the lens is also preferably the length D/n, D being the total displacement of the sample during the creation of an optical tomogram. Thus, in this method, instead of a spiral sequence of layer images, a number of n rings each consisting of $$\frac{360}{\alpha}$$

individual images are formed.

However, a method variant has been found to be particularly preferred in which the sample is displaced continuously along the longitudinal axis of the lens and/or perpendicular to the plane of the previously recorded image during the recording of at least 3 images, preferably at least 50 images, particularly preferably at least 360 images, from different angles a. In this method variant, the sample is preferably displaced along the longitudinal axis of the lens continuously throughout the data collection period. The rotation of the sample is superposed on this linear displacement thereof. In this method variant too, the sample accordingly moves in a smooth spiral through the focal plane of the lens, which plane—as disclosed above—is preferably not changed throughout the measurement.

It has been found to be a major advantage of this method variant that the two superposed movement components can run continuously, and neither breaking nor acceleration of the sample is required. Accordingly, the forces acting on the sample during the measurement are minimised. The sample is thus not expected to slip relative to the lens or to be deformed by the occurring forces. It has further been shown that, because the sample also continues to move during the image capture, there are still no (movement) artefacts in the image since the exposure time for transmission images is generally very short. The exposure time is usually selected in such a way that there is merely a small movement of the sample that no blurring of the sample is detected. If artefacts of this type are expected nevertheless, this could for example be eliminated by synchronising the image capture with strong flashes.

The speed advantage of the above-disclosed method are to be described by way of the following comparison with the more classical approach of acquiring a full stack at each angle. If for example 20 layer images of different sample depths are to be taken in a sample, each 20 μm apart, 7200 individual recordings are required. Focussing on 20 different planes for each angle usually takes approximately 10 minutes in total. By contrast, according to the present method, in which the camera continuously captures the same focal plane and the sample is passed through this detection plane/focal plane in a spiral, this can be reduced to 2 minutes for the same number of 7200 individual images at a frame rate of 60 Hz. As stated above, movement blurs can be prevented by using LED flashes and short exposure times (of approximately 1 ms).

A method variant has been found to be preferred in which the optical axis of the objective lens is arranged to lie in the horizontal plane. In this method variant, the sample is rotated perpendicular to the longitudinal direction of the lens and more preferably about a vertical axis. This is advantageous because the direction of the gravity acting on individual parts of the sample during the rotation does not vary eliminating any deformations due to gravity.

As stated above, it is advantageous if the sample is held substantially vertical. For this purpose, it may either be deposited on a vertically upright support or be hung down into the coverage region of the lens from above. To arrange the sample in the optical coverage region of the lens of the microscope, it has been found to be particularly advantageous to hang the sample down into the coverage region of the lens. This means that the sample can be handled and in particular rotated in a very simple manner and largely without friction. Preferably, before the first recording, the sample is precisely positioned on the rotational axis and in the optical coverage region of the lens of the microscope, preferably by means of micrometer screws arranged on the sample holding system. However, the sample may also be precisely positioned using other suitable devices. The rotation of the sample and the displacement in the direction of the lens are preferably carried out by actuating and moving the entire sample suspension system accordingly. This usually includes a manipulator, by means of which the sample can be precisely orientated in the coverage region of the lens. The movement is preferably controlled by means of linear or servo motors.

The microscope preferably comprises a device for detecting digital images, for example a digital camera or CCD camera. In a preferred method variant, the individual images are therefore captured digitally and saved in a memory. Subsequently, they are preferably combined by a data processing device to form a three-dimensional model. It is advantageous if the calculation of the three-dimensional model of the sample only begins after the first complete rotation of the sample through 360°. The b uffer for storing individual images therefore has to be at least large enough to be able to store the number of individual recordings which are to be made during a complete rotation of the sample through 360°. In this procedure, instead of following the spiral or ring shape, in which the individual recordings are taken, the calculation of the three-dimensional structure preferably takes place in batches as a function of the respective recording angle.

A method variant is more strongly preferred in which a bright-field or transmitted-light microscope is used as the optical microscope.

A further essential aspect of the invention is an optical microscope for creating tomograms, which comprises at least one lens, at least one sample holder and at least one light source, the sample holder
a) being rotatable about an axis arranged perpendicular to the longitudinal axis of the lens and
b) being displaceable along the longitudinal axis of the lens.

By way of a microscope of this type, when recording a plurality of images of an individual sample it is possible merely to have to set the focus once and to bring different angles and sections of the sample into the focal plane in each case by rotating and displacing the sample.

An embodiment is preferred in which the microscope comprises a data processing device having a memory or in which it is connected to one, in such a way that by means of said device individual images captured digitally by the microscope can be stored and subsequently combined to form a three-dimensional model of the sample. A data processing device of this type may for example be a computer on which corresponding software can be run. Software of this type has to include an algorithm by means of which it is possible to assemble a stack of individual images to form a three-dimensional model.

In a preferred embodiment, the memory of the optical microscope has a minimum storage capacity which makes it possible to store at least a number i of images which can be captured during a rotation of the sample through 360°, i being the number of individual images recorded during a complete rotation of the sample. If after rotation through an angle a a section image is captured, i is $$\frac{360}{\alpha}.$$

A further preferred embodiment of the optical microscope is a bright-field microscope in which at least one light source is arranged on the side of the sample opposite the lens. Preferably, the light source is arranged along the longitudinal axis of the lens but on the opposite side of the sample with respect to the lens. This arrangement of the light source has been found to be particularly advantageous because the provided displacement of the sample along an extension of the longitudinal axis of the lens means that the angle of the incident light in a dark-field or incident-light microscope is forced to change slightly, in such a way that additional artefacts due to altered incident light can occur during recording. By contrast, in the bright-field microscope, a light source may always be arranged on an extension of the longitudinal axis of the lens on the side opposite the sample, and the sample may thus illuminate the sample from the rear face thereof irrespective of the positioning of said sample between the lens and the light source.

Further advantages, aims and properties of the present invention are described by way of the following description of accompanying drawings, in which individual embodiments of the method and the microscope are shown by way of example. Parts of the microscope which are shown in the drawings and substantially correspond in function may be denoted by like reference numerals, although these components need not be numbered and illustrated in all of the drawings.

In the drawings:

FIG. 3b is a side view of the sample mounting system comprising a manipulator from FIG. 3a;

FIG. 3c is a view from diagonally below of the sample mounting system comprising a manipulator from FIG. 3a;

Figure 6A:
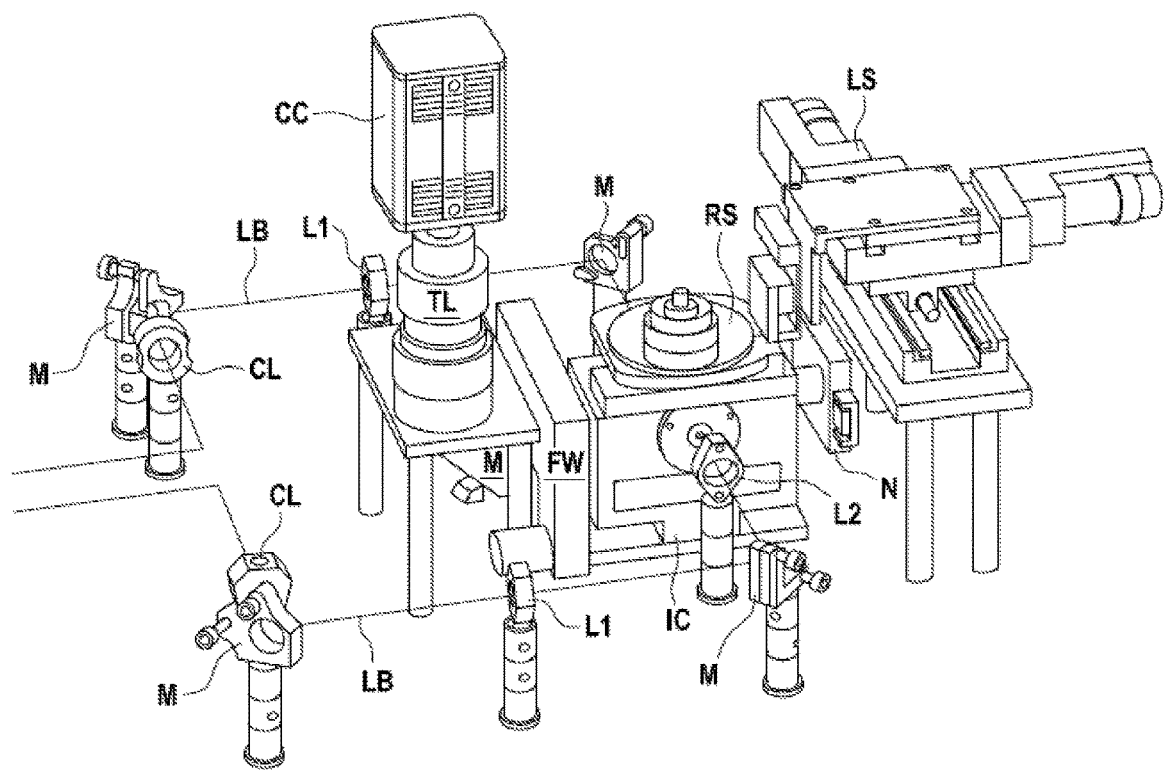
Figure 6B:
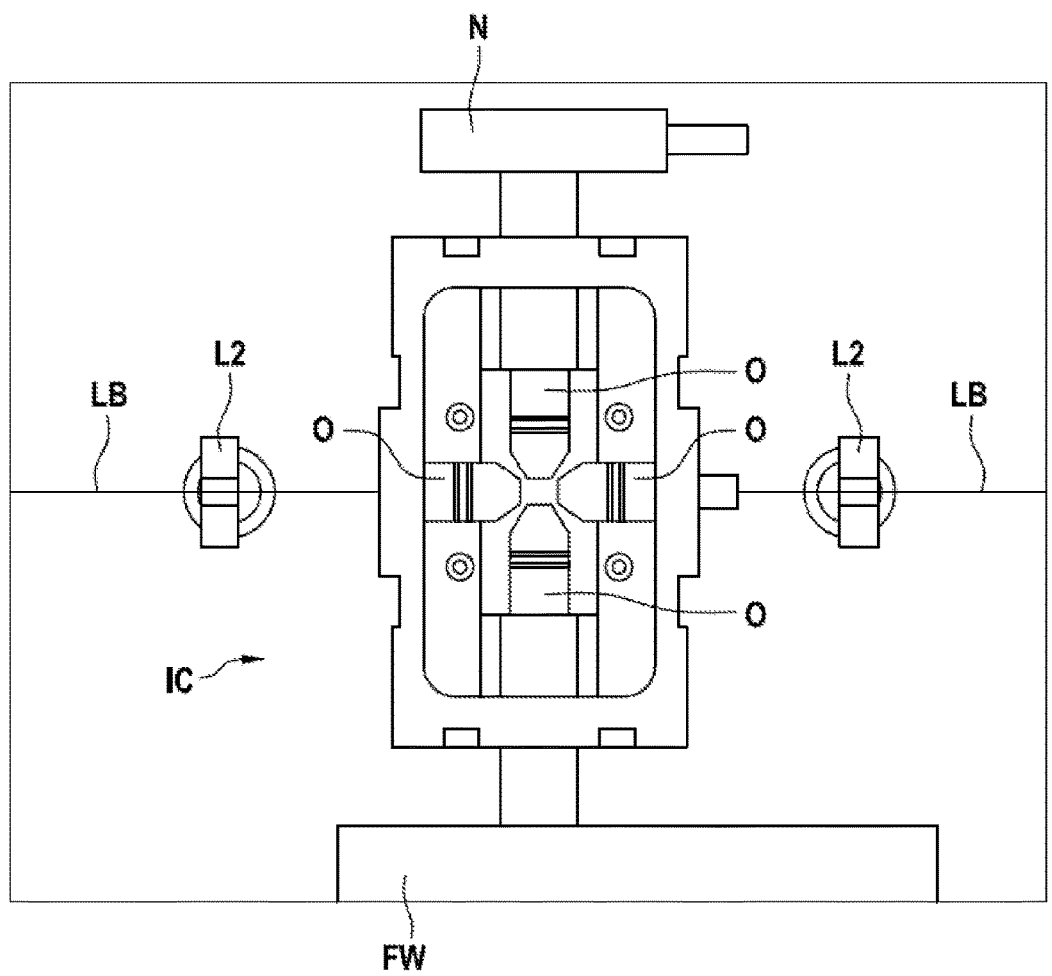

FIG. 6a gives an overview of the optical setup;

FIG. 6b is a top view of the imaging chamber.

Figure 1A:
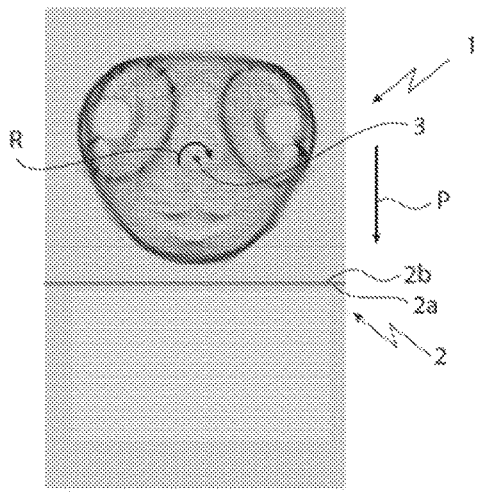
FIG. 1a is a plan view of a sample prior to positioning in the focal plane.

FIG. 1a is a plan view of a sample 1 prior to positioning on the focal plane 2. In this example, the sample 1 is a zebrafish embryo, of which merely a section in the head region is shown in this example. By way of the additional inserted point 3 approximately at the centre of the sample 1, a point or axis is marked about which the sample 1 can be rotated (in direction R). Moreover, displacement of the sample 1 in the direction of the arrow P is provided. As a result of a combination of these two movements P, R, different layers 4 of the sample 1 arrive on the focal plane 2 at different angles a at different times T. The focal plane 2 is marked by parallel lines 2a, 2b which are intended to indicate the position of the focal plane. The lens 5 is not shown in FIG. 1a. However, it is located on the side of the focal plane 2 opposite the sample 1. An illumination device 6 (also not shown in FIG. 1a) is arranged on the side of the sample 1 opposite the focal plane 2 with respect to the lens 5.

FIG. 1a shows the arrangement of the sample 1 with respect to the focal plane 2 prior to the start of data recording. The sample 1 has not yet been displaced in the direction P of the focal plane, and so there is not yet a layer 4 (see FIG. 1c) of the sample 1 located on the focal plane 2.

Figure 1B:
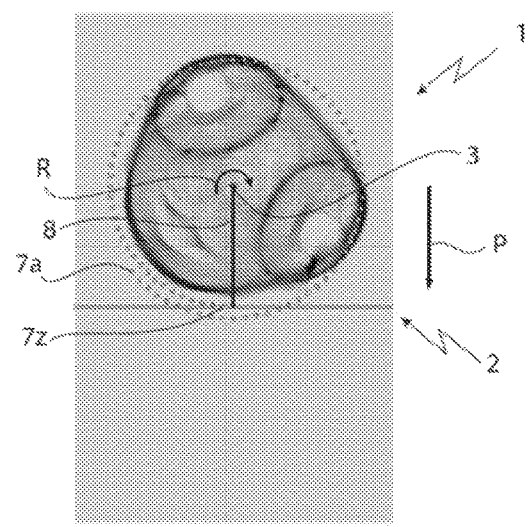
FIG. 1b is a plan view of a sample while images are being taken in the focal plane.

FIG. 1b is a plan view of a sample 1 during the recording of section images along the focal plane 2. As can be seen in FIG. 1b, in particular in comparison with FIG. 1a, the sample 1 is rotated and displaced in the direction of the arrows P, R. The points 7a-7z shown in FIG. 1b each represent a particular recording position. Each point 7a-7z represents a recorded section image which is perpendicular to an imaginary line 8 connecting the respective point 7a-7z to the axis of rotation 3. The points 7a-7z are arranged in a spiral, and the arrangement of the focal plane 2 or imaging plane can be seen by way of the example of the point 7z arranged innermost on the spiral.

The spiral arrangement of the recorded section images, which as described above is indicated by the points, results from a superposition of the rotational movement of the sample 1 about the axis 3 and a simultaneous displacement of the sample 1 along the arrow P.

Figure 1C:
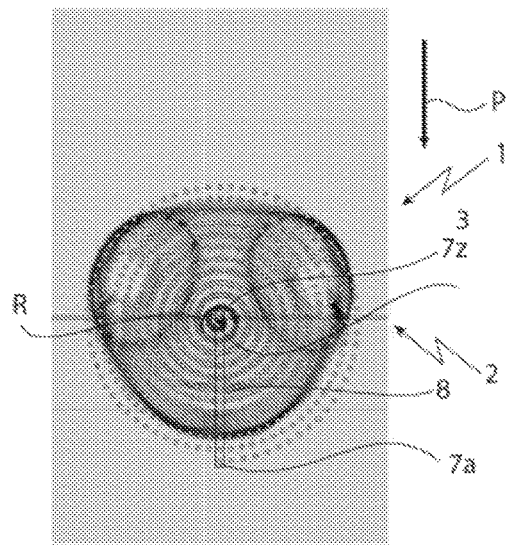
FIG. 1c is a sample at the end of a series of recordings, having the central plane in the focal plane.

This becomes clearer in FIG. 1c. This shows a sample 1 having a central section plane in the focal plane 2. As in FIG. 1b, each of the points 7a-7z represents a section image which has been recorded from the corresponding angle α. As can be seen in this drawing, section images are recorded from each angle α independently of the displacement of the sample 1. As a result, there is a very high density of section images, which make very precise calculation of the internal objects in the sample 1 possible, in particular in the vicinity of the axis of rotation 3. Since the light scattering is greatest in the interior of a sample 1, a corresponding comparison can thus be achieved by way of the increased recording density. The rectangle 17 drawn in FIG. 1c indicates a stack or batch of section images corresponding to a specific angle α.

Figure 2:
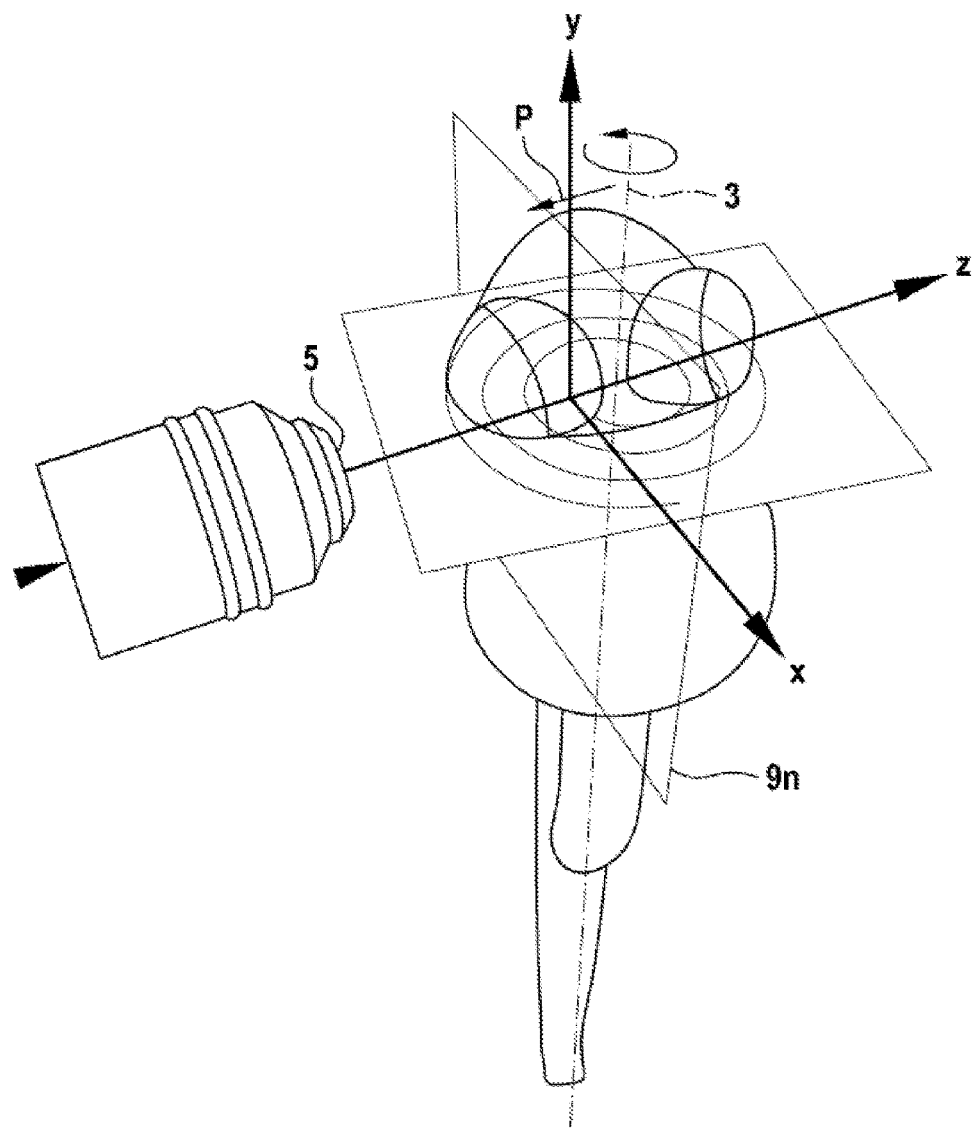
FIG. 2 is a schematic drawing of a few images of a sample arranged in a spiral.

FIG. 2 is a schematic drawing of section images 9, arranged in a spiral, of a sample 1. The principle disclosed previously in connection with FIG. 1a-c is illustrated schematically again in FIG. 2. FIG. 2 shows a lens 5 of the microscope which is suitable for sharply imaging a section image 9 of a sample 1 in each case. The focal plane 2 is indicated in FIG. 2 by the axes x, y, which are perpendicular to the axis z representing the longitudinal direction of the lens 5. FIG. 2 shows section image 9 which represent an example of a number of already recorded section images 9. These are arranged along a spiral. This spiral results from the displacement and simultaneous rotation of the sample. The sample is rotated about an axis 3 which is displaced in the direction of the arrow P or in the opposite direction during the course of the measurement. The displacement is parallel to the longitudinal axis z of the lens 5. Accordingly, this axis z and the arrow P representing the displacement direction extend parallel. Accordingly, in the schematic drawing, in the current arrangement a section of the sample denoted 9n would be recorded. This section is located on the focal plane 2 and is perpendicular to the longitudinal axis z of the lens 5. As the data recording continues, further section images 9 (not shown) would be recorded which extend in a spiral as far as the axis of rotation 3.

Figure 3A:
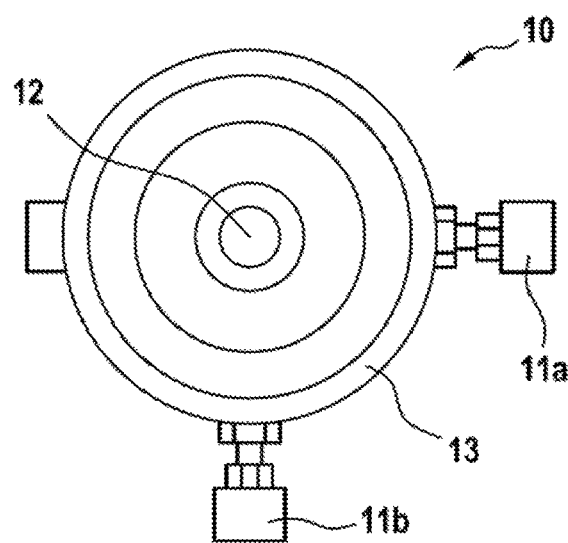
FIG. 3a is a view from below of a sample mounting system comprising a manipulator.

FIG. 3a is a view from below of a sample suspension device 10 having a manipulator 11a, 11b. The actual sample suspension takes place in the centre of the suspension system 12 shown, which is in the form of an insert 12 (not shown) into an annular holder 13, the position of which can be varied very precisely by way of micrometer screws 11a and 11b arranged on the holder 13. The micrometer screws 11a and 11b are arranged at a 90° angle to one another, in such a way that precise positioning is possible in these directions. The two micrometer screws 11a, 11b allow to move the sample 1 relative to the rotational axis of the rotating stage RS of the microscope (not shown in FIG. 3a, see FIG. 6a) and to center the sample 1 in the field of view during the entire 360° rotation.

Figure 3B:
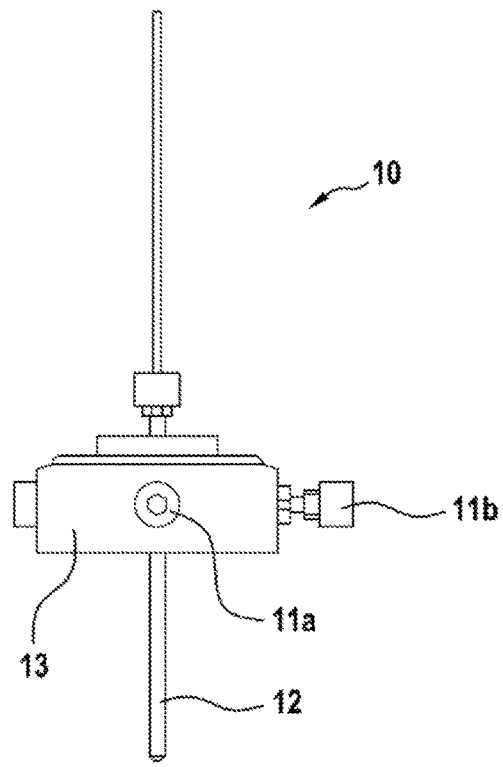

FIG. 3b is a side view of the sample suspension device 10 having a manipulator 11a, 11b from FIG. 3a. The ring 13 having the micrometer screws 11a and 11b, which holds the actual sample suspension system 12 and by means of which the position thereof can be set precisely, can be seen in the central region of the drawing. The sample 1 itself is arranged at the lower end of the sample suspension system 12. To rotate the sample, the entire sample suspension system 12 is rotated. For displacing the sample 1 in the longitudinal direction of the lens 5, the sample suspension device 10 including the manipulator ring 13 is displaced.

Figure 3C:
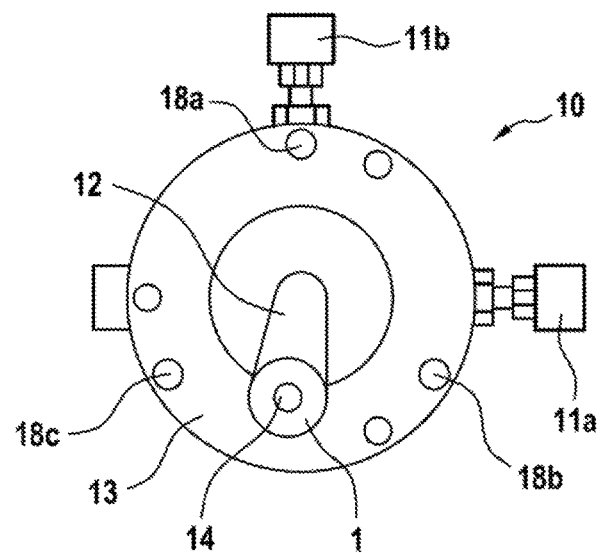

FIG. 3c is a view from diagonally below of the sample suspension device 10 having a manipulator 11 from FIG. 3a. In this drawing, it can be seen that the sample suspension system 12 has an opening 14, in which the sample 1 can be arranged, at least at the lower end. The sample 1 projects out beyond the lower end of the sample suspension system 12. As in FIG. 3a, the micrometer screws 11a and 11b arranged mutually perpendicular can be seen to the side of the holding ring 13 for the sample suspension system 12, by means of which the sample suspension system 12 can be precisely positioned.

Additionally, three magnets 18a, 18b, 18c are positioned at the lower surface of the sample holder 13. It is preferred to position at least three magnets in order to mount the sample holder 13 to the rotating stage RS of the imaging chamber IC (see FIGS. 6a and 6b). The middle axis of the first one 18a of the magnets 18a, 18b, 18c intersects the extension of the length axis of the manipulator 11b to form a right angle with it.

According to a preferred embodiment, FIG. 3a further shows the three magnets 18a, 18b, 18c being arranged on the circumference of a common virtual circle, wherein the diameter of the common virtual circle is in the range of 80-99%, preferably in the range of 85-90% of the outer diameter of the sample holder 13. Furthermore, magnet 18a is spaced apart from the other two magnets 18b, 18c by an angle of 120°. As a result, this applies analogously to each of the other two magnets 18b and 18c.

The three magnets 18a, 18b, 18c each show a cylindrically shape with the same diameter. A lower surface of the three magnets 18a, 18b, 18c preferably flushes with the lower surface of the sample holder 13.

Figure 3D:
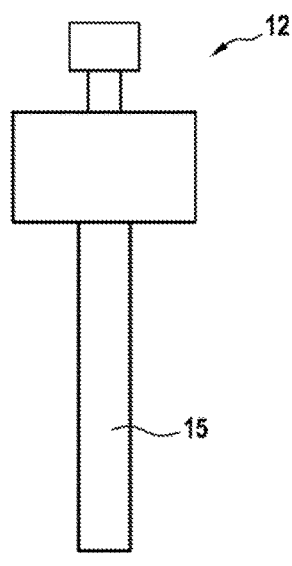
FIG. 3d is a side view of a sample mounting system.

The sample suspension system 12 itself is shown as a whole in FIG. 3d. It is distinguished by an elongate cylindrical shaft 15 in which the sample 1 is held and can be introduced from above into the coverage region of the lens 5. By way of an extended region, the sample suspension system 12 is mounted in a holding ring 13 (not shown).

Figure 3E:
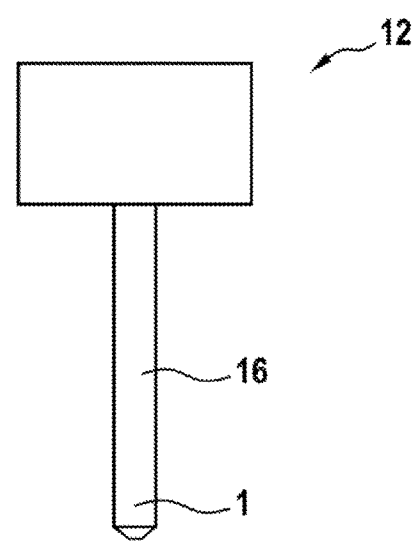
FIG. 3e is a detail of a sample mounting system having a sample attached thereto.

FIG. 3e is a detail of the sample suspension system 12 having a sample 1 attached thereto. The lower end of the sample suspension system 12 can be seen, from which a transparent tube 16 attached therein protrudes. The sample 1 is located in this tube 16, which may be filled with air, water, a buffer, a nutrient solution or a gel. Because of the transparent tube 16 and the likewise medium located therein, the sample 1 can be optically captured by the lens 5. The material of the transparent tube 16 and the medium located therein preferably have the same or at least a very similar refractive index.

Figure 4A:
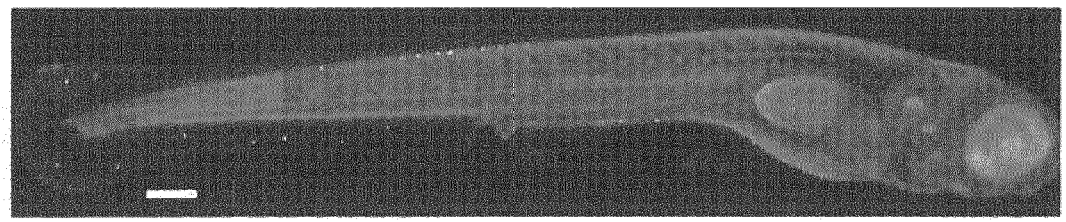
FIG. 4a is a maximum intensity projection of an inverted reconstruction of a zebrafish embryo from the tomography method.

FIG. 4a-d show the result of imaging a sample of this type. FIG. 4a is an image of a zebrafish embryo 21 from the incident-light method.

Figure 4B:
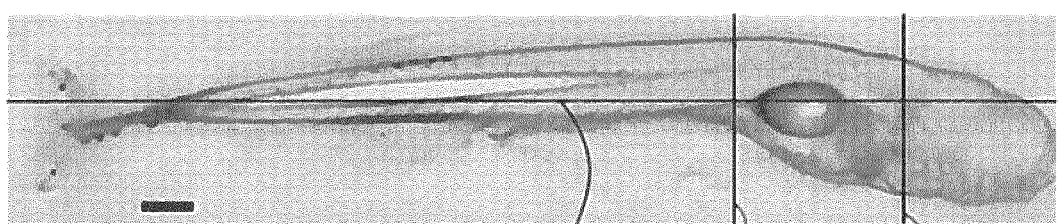
FIG. 4b is a sagittal slice of a reconstructed zebrafish embryo from the tomography method.

FIG. 4b is a side view of a zebrafish embryo 21 from the transmitted-light method, as recorded in accordance with the present invention. For this recording, the zebrafish embryo 21 was arranged in the sample tube 16 in such a way that the longitudinal axis thereof extended largely parallel to the longitudinal axis of the sample tube 16. The axis of rotation 3 about which the sample 1, 21 was rotated during recording is marked by the line 3 extending in the longitudinal direction of the zebrafish embryo 21.

Figure 4C:
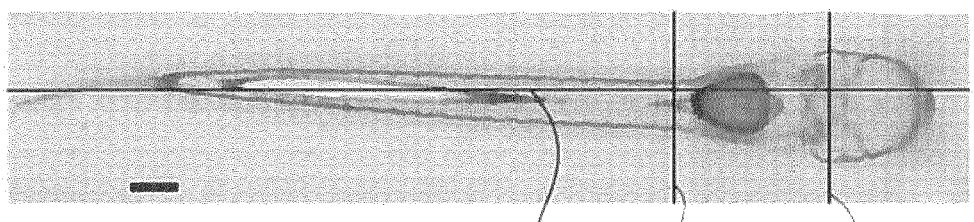
FIG. 4c is a coronal slice of a reconstructed zebrafish embryo from the tomography method.

FIG. 4c is a further view of the same zebrafish embryo 21 from the transmitted-light method, but after rotation through 90°. In FIG. 4c the axis of rotation 3 is also marked by the line 3 extending parallel to the longitudinal orientation of the zebrafish embryo. The lines 22, 23 extending perpendicular to the longitudinal zebrafish embryo in FIGS. 4b and 4c represent sections as shown in FIGS. 4d and 4e.

Figure 4D:
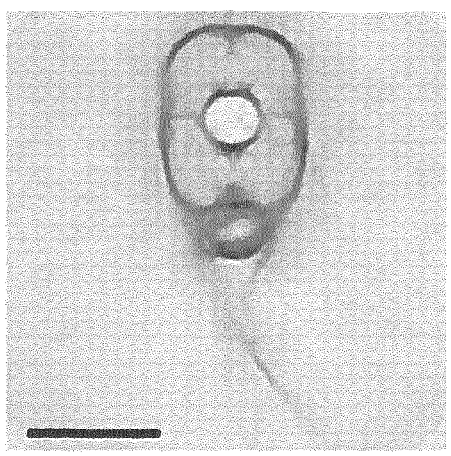
FIG. 4d is a transverse slice in the trunk of a reconstructed zebrafish embryo from the tomography method.

Accordingly, FIG. 4d is a sectional view of a zebrafish embryo 21 perpendicular to the longitudinal axis thereof. Thus, image 4d is not an image recorded by the microscope, but a section calculated from a plurality of images. In the example shown, the microscope exclusively records sections from planes which extend parallel to the axis of rotation 3, such as are shown for example in FIGS. 4b and 4c. Because of the very good resolution which can be achieved by this method and the rapid recording process, after calculating the three-dimensional structure it is also possible to have sections 22, 23 perpendicular to the recording axis displayed. As can be seen from image 4d, even a calculated sectional view of this type is low in artefacts and makes possible very precise conclusions as to the positioning of individual objects in the interior of the sample 1, 21.

Figure 4E:
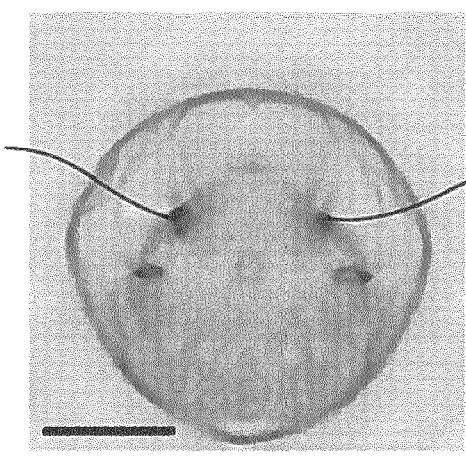
FIG. 4e is a transverse slice in the head of a reconstructed zebrafish embryo from the tomography method.

This is even clearer in the image of FIG. 4e. FIG. 4e is likewise a sectional view 22, 23 of a zebrafish embryo 21, but in the region of the head at the level of the eyes. The eyes can be seen as black dots 24a and 24b and can be localised very well.

Figure 5A:
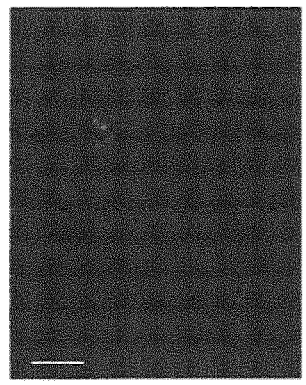
FIG. 5a is a single slice of a zebrafish embryo imaged by light sheet fluorescence microscopy (LSFM)

A further highly advantageous representation possibility is shown in FIG. 5a-5g. FIG. 5a is a sectional view of a zebrafish embryo 21 by light sheet fluorescence microscopy (LSFM). Fluorescence-marked regions can be captured selectively. However, all other regions of the zebrafish embryo 21 which are not fluorescence-marked are not shown in this method. Thus, in this method, in particular information as to the arrangement of the fluorescence-marked objects in the interior of the embryo is lost. LSFM merely makes it possible to represent all of the fluorescence-marked or fluorescing objects and the relative arrangement thereof.

Figure 5B:
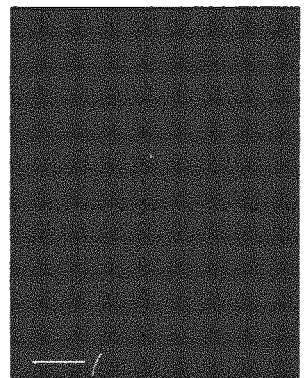
FIG. 5b is a combination of the image of FIG. 5a and the respective plane from the tomographic reconstruction.

FIG. 5b is a combination of the LSFM-image of FIG. 5a in superpositions of a transmitted-light microscopy sectional view of the same object. As a result of this superposition, it is possible to localise the fluorescence-marked objects in the interior of the zebrafish embryo 21. Conclusions as to the spatial arrangement and the distribution of the fluorescence-marked objects are thus possible.

Figure 5C:
FIG. 5c is from the same dataset as in FIG. 5b, but now showing the entire dataset in a maximum intensity projection.

FIG. 5c is a superposed layer view analogous to FIG. 5b but of a different layer. In this case too, conclusions can be drawn as to the localisation of the fluorescence-marked particles in the interior of the zebrafish embryo 21. For example, no fluorescence-marked particles can be detected in the yolk sac 25, which can be seen in the bottom-left image portion.

Figure 5D:
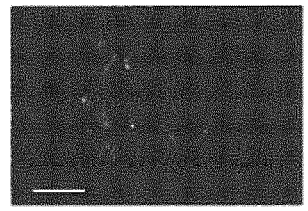
FIG. 5d is a LSFM-image of a layer from the head region of a zebrafish embryo.

FIG. 5d is a LSFM view of a layer from the head region of the zebrafish embryo. This image is not an image recorded by the microscope, but rather a sectional view calculated back from the 3D model. As in FIG. 5a, it is not possible to draw conclusions as to the positioning of the individual fluorescence-marked particles in the interior of the zebrafish embryo 21, but rather only the arrangement of the fluorescence-marked objects relative to one another can be determined.

Figure 5E:
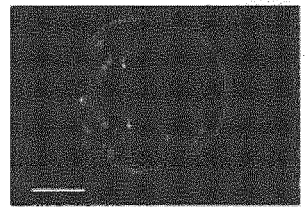
FIG. 5e is a combination of the image of FIG. 5d and the respective plane from the tomographic reconstruction.

FIG. 5e is a superposition of the image of FIG. 5d with a corresponding transmitted-light microscopy layer view. In this case too, the transmitted-light microscopy layer view is not a layer recorded as an image by the transmitted-light microscope, but rather a layer calculated from the 3D model. However, as a result of the superposition with the fluorescence data from FIG. 5d, a conclusion is possible as to the concentration and localisation thereof relative to the non-fluorescence-marked boundaries of the zebrafish embryo 21.

Figure 5F:
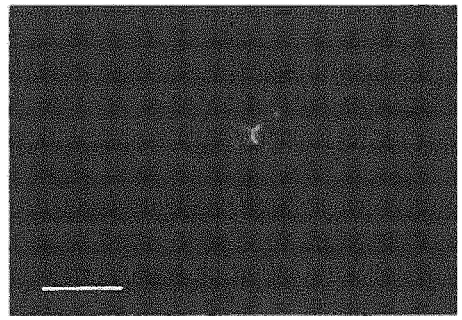
FIG. 5f is a LSFM-image of a section through a zebrafish embryo at the level of the yolk sac.

FIG. 5f is a LSFM view of a section through a zebrafish embryo at the level of the yolk sac 25. Since, as stated previously in relation to FIG. 5c, the yolk sac 25 does not contain any fluorescence-marked objects, there is no information on the size and arrangement of the yolk sac 25 in the pure fluorescence view. Any relevant data are suppressed in this recording technique.

Figure 5G:
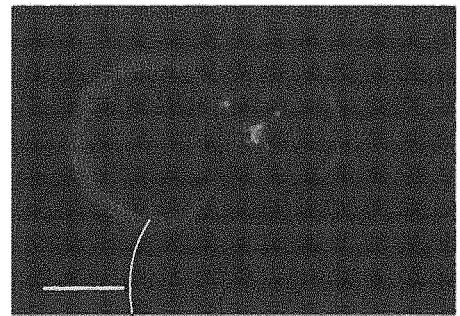
FIG. 5g is a combination of the image of FIG. 5f and the respective plane from the tomographic reconstruction.

FIG. 5g is a superposition of the LSFM image of FIG. 5f with a corresponding transmitted-light microscopy sectional view. By combining the data from the two different methods, a conclusion is possible as to the concentration and localisation of fluorescence-marked objects, such as proteins, in the interior of the zebrafish embryo 21. Thus, as a result of this recording technique, the presence of fluorescence-marked objects in the interior of objects not detectable by LSFM can be represented. A representation of this type can be highly advantageous in particular for physiological processes and the time-resolved representation thereof. They make it possible to trace the distribution of the fluorescence-marked objects in the interior of the organism in time-resolved measurements.

FIG. 6a shows a schematic of the microscope setup. Each laser beam LB used for bidirectional SPIM illumination is passed through a cylindrical lens CL, a telescope (lenses L1 and L2) and sent to the imaging chamber IC through an illumination lens. Two 45° mirrors M are used to properly align each beam. Brightfield illumination is provided in transmission mode by an LED backlight N. The sample 1 (not shown) dips into the medium-filled imaging chamber IC from the top. It is held and moved by a fast rotational stage RS and a 3-axis linear stage LS. The image of the sample 1 is formed at the detector using a water-dipping objective O (see FIG. 6b) and a tube lens TL. The detected light is passed through a filter wheel FW and a 45° mirror M.

FIG. 6b shows a top view of the imaging chamber IC. Illumination and detection are provided by four water-dipping objectives O. Light-sheets illuminate the sample from two opposite sides (beams LB) and brightfield illumination is provided by an LED backlight N, placed at the back of one of the objectives O. The transmitted or fluorescence light is collected by a fourth objective O and passed through the filter wheel FW.

LIST OF REFERENCE NUMERALS 1 sample
2 focal plane 3 point/axis
4 layer
5 lens
6 illumination device
7 point
8 imaginary line
9 section image
10 sample suspension device
11 manipulator/micrometer screw
12 sample suspension system
13 annular holder
14 opening
15 cylindrical shaft
16 sample tube
17 rectangle
18a, b, c magnets
21 zebrafish embryo
22 line/section view
23 line/section view
24 eye
25 yolk sac
CC CMOS camera
CL cylindrical lens
FW filter wheel
L1, L2 telescope
LB laserbeam
LS 3-axis linear stage
M mirror
N LED backlight
O objective
R direction of rotation
RS rotational stage
P arrow/direction of displacement
T time
x axis
y axis
z axis
α angle

The invention claimed is:

1. A method for creating an optical tomogram, said method comprising the following steps:
providing an optical microscope,
arranging a sample in the optical coverage region of a lens of the microscope,
setting the focus of the lens to a particular focal plane,
recording an image of the sample through the microscope,
rotating the sample through an angle α,
optionally displacing the sample along the longitudinal axis (z) of the lens and/or perpendicular to the plane of the previously recorded image,
continuing the method with a step of recording an image of the sample through the microscope until a predetermined number of section images of the sample have been recorded,
wherein the sample is displaced along the longitudinal axis (z) of the lens and/or perpendicular to the plane of the previously recorded image, in accordance with the step of optionally displacing the sample along the longitudinal axis (z) of the lens and/or perpendicular to the plane of the previously recorded image, at least once during a rotation of the sample through 360°,
wherein the sample is imaged n times from each angle α, in different focal planes in each case, n being greater than 3,
wherein after each rotation through the angle α the sample is displaced by a distance along the longitudinal axis (z) of the lens and/or perpendicular to the plane of the previously recorded image, said distance corresponding to a length of $$\frac{360 \cdot D}{a \cdot n},$$

D being the total displacement of the sample during the creation of the optical tomogram, or wherein after a complete rotation through 360° the sample is displaced by a distance along the longitudinal axis (z) of the lens and/or perpendicular to the plane of the previously recorded image, said distance corresponding to a length of $$\frac{D}{n},$$

D being the total displacement of the sample during the creation of an optical tomogram.

2. The method according to claim 1, wherein n is greater than 5.

3. The method according to claim 1, wherein n is between 10 and 1000.

4. The method according to claim 1, wherein n is between 15 and 100.

5. The method according to claim 1, wherein the lens is arranged substantially horizontal.

6. The method according to claim 1, wherein to arrange the sample in the optical coverage region of the lens, said sample is hung down into the coverage region of the lens.

7. The method according to claim 1, wherein, before the first recording, the sample is precisely positioned to lie on the rotational axis in the optical coverage region of the lens of the microscope.

8. The method according to claim 1, wherein, before the first recording, the sample is precisely positioned to lie on the rotational axis in the optical coverage region of the lens of the microscope by means of micrometer screws arranged on the sample suspension device.

9. The method according to claim 1, wherein the individual images are captured digitally and saved in a memory and combined by a data processing device to form a three-dimensional model, which images the internal three-dimensional structure of the sample.

10. The method according to claim 9, wherein the calculation of the three-dimensional model of the sample only begins after the first complete rotation of the sample through 360°.

11. The method according to claim 1, wherein a brightfield microscope is used as the optical microscope.

12. An optical microscope for creating tomograms, which comprises at least one lens, at least one sample suspension device and at least one illumination device,
wherein the sample suspension device is rotatable about an axis arranged perpendicular to the longitudinal axis (z) of the lens and is displaceable along the longitudinal axis (z) of the lens, and
wherein the optical microscope comprises a data processing device having a memory or is connected to one, by means of which device individual images captured digitally by the microscope can be stored and subsequently combined to form a three-dimensional model of the sample.

13. The optical microscope according to claim 12, wherein the memory has a minimum storage capacity able to store at least a number n of images which can be captured during a rotation of the sample through 360°.

14. The optical microscope according to claim 12, wherein the optical microscope is a bright-field microscope and at least one illumination device is arranged on the side of the sample opposite the lens.

15. A method for creating an optical tomogram, comprising the following steps:
providing an optical microscope,
arranging a sample in the optical coverage region of a lens of the microscope,
setting the focus of the lens to a particular focal plane,
recording an image of the sample through the microscope,
rotating the sample through an angle α,
optionally displacing the sample along the longitudinal axis (z) of the lens and/or perpendicular to the plane of the previously recorded image,
continuing the method with a step of recording an image of the sample through the microscope until a predetermined number of section images of the sample have been recorded,
wherein the sample is displaced along the longitudinal axis (z) of the lens and/or perpendicular to the plane of the previously recorded image, in accordance with the step of optionally displacing the sample along the longitudinal axis (z) of the lens and/or perpendicular to the plane of the previously recorded image, at least once during a rotation of the sample through 360°, and
wherein the sample is displaced continuously along the longitudinal axis (z) of the lens and/or perpendicular to the plane of the previously recorded image during the recording of at least 3 images from different angles α.

16. The method according to claim 15, wherein the lens is arranged substantially horizontal.

17. The method according to claim 15, wherein to arrange the sample in the optical coverage region of the lens, said sample is hung down into the coverage region of the lens.

18. The method according to claim 15, wherein, before the first recording, the sample is precisely positioned to lie on the rotational axis in the optical coverage region of the lens of the microscope.

19. The method according to claim 15, wherein, before the first recording, the sample is precisely positioned to lie on the rotational axis in the optical coverage region of the lens of the microscope by means of micrometer screws arranged on the sample suspension device.

20. The method according to claim 15, wherein the individual images are captured digitally and saved in a memory and combined by a data processing device to form a three-dimensional model, which images the internal three-dimensional structure of the sample.

21. The method according to claim 20, wherein the calculation of the three-dimensional model of the sample only begins after the first complete rotation of the sample through 360°.

22. The method according to claim 15, wherein a bright-field microscope is used as the optical microscope.

* * * * *